United States Patent [19]

Tsubouchi et al.

[11] 4,367,824

[45] Jan. 11, 1983

[54] FLUID RESERVOIR WITH COVER FASTENING MEANS

[75] Inventors: Kaoru Tsubouchi; Akira Funahashi, both of Toyota, Japan

[73] Assignee: Aisin Seiki Kabushiki Kaisha, Kariya, Japan

[21] Appl. No.: 282,590

[22] Filed: Jul. 13, 1981

[30] Foreign Application Priority Data

Jul. 16, 1980 [JP] Japan .......................... 55-100950[U]
May 29, 1981 [JP] Japan ................................ 56-083347

[51] Int. Cl.³ .............................................. B65D 45/16
[52] U.S. Cl. .................................... 220/326; 220/306; 137/558
[58] Field of Search ....................... 220/306, 326, 209; 137/588, 558; 340/59, 60

[56] References Cited

U.S. PATENT DOCUMENTS

| | | | |
|---|---|---|---|
| 3,080,995 | 3/1963 | Palm | 220/326 |
| 3,271,938 | 9/1966 | Rest et al. | 220/326 X |
| 3,654,956 | 4/1972 | Tsubouchi | 137/558 |
| 3,792,433 | 2/1974 | Wada | 340/52 C |
| 3,907,155 | 9/1975 | Smith et al. | 220/326 X |
| 4,136,712 | 1/1979 | Nogami et al. | 137/558 |

*Primary Examiner*—George T. Hall
*Attorney, Agent, or Firm*—Oblon, Fisher, Spivak, McClelland & Maier

[57] ABSTRACT

A fluid reservoir assembly including a reservoir cap for closing a cylindrical opening of the reservoir, the reservoir assembly including an outward flange formed on an outer periphery of an upper portion of the reservoir, nail members provided on the reservoir cap and having a tip portion bent radially inwardly, a biasing member biasing the nail members into engagement with the outward flange and a nail operating mechanism connected to the nail members for moving the nail members against the biasing member.

9 Claims, 9 Drawing Figures

FLUID RESERVOIR WITH COVER FASTENING MEANS

BACKGROUND OF THE INVENTION

1. Field of the Invention

The present invention relates to a fluid reservoir for master cylinder and more particularly to a fluid reservoir which characterizes a reservoir cap holding mechanism.

2. Description of the Prior Art

Conventionally, many mechanisms have been used as reservoir cap holding mechanism. In a first typical conventional mechanism, a reservoir cap is held on a reservoir by engagement between an elastically deformable annular fringe portion thereof and an outer periphery of an upper end portion, provided with an outward flange, of the reservoir. In a second conventional mechanism, a reservoir cap is held on a reservoir by engagement between an elastically deformable central boss portion thereof and an inner periphery of an upper end portion of the reservoir.

In a third conventional mechanism, a reservoir cap is held on a reservoir by screw-engagement between the reservoir cap and an upper end portion of the reservoir. In a fourth conventional mechanism, a reservoir cap is held on a reservoir by engagement between a nail member thereof and a member, corresponding to the nail, on the reservoir. The engagement between the nail member of the reservoir cap and the member on the reservoir is released by turning the reservoir cap.

However, in the first and second conventional mechanisms, great effort is required to attach or detach the reservoir cap to or from the reservoir, since the fringe portion or the boss portion of the reservoir cap is provided with relatively greater elasticity for sealingly closing an upper opening of the reservoir. Furthermore, in the first conventional mechanism, it is difficult to measure the misalignment between the reservoir cap and the reservoir thereby causing fluid leakage out of the reservoir. In the third conventional mechanism, a relatively longer time is required to attach or detach the reservoir cap to or from the reservoir. Moreover, in the fourth conventional mechanism, a sealing member, which is provided on the reservoir cap and is in sealing engagement with an inner peripheral wall of the reservoir when the reservoir cap is attached to the reservoir, is twisted upon turning of the reservoir cap thereby causing damage to the sealing member.

SUMMARY OF THE INVENTION

An object of the present invention is to provide a new and improved fluid reservoir which obviates the disadvantages of prior art fluid reservoirs.

More particularly, it is an object of the present invention to provide a new and improved fluid reservoir wherein nails provided on a reservoir cap will be biased by a biasing member into engagement with an outward flange provided on an upper portion of a reservoir, and the nails will be interconnected to operating tabs so as to move the nails by the operating tabs against the biasing member.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein.

DETAILED DESCRIPTION OF THE PREFERRED EMBODIMENTS

Figure 1:
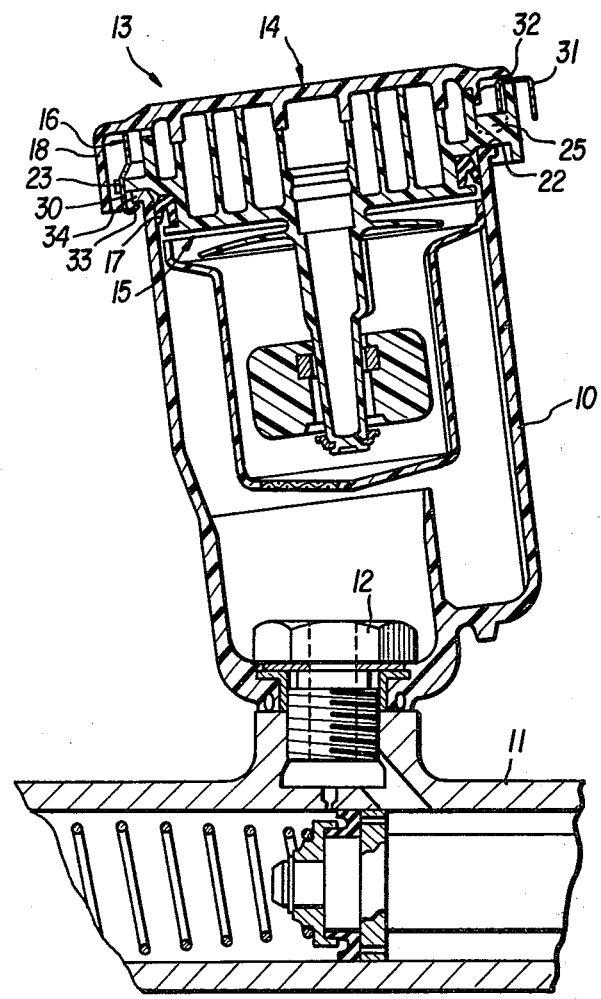
FIG. 1 is a side sectional view of a first embodiment of a fluid reservoir according to the present invention.

Referring now to FIGS. 1 to 7, a fluid reservoir 10 made of synthetic resin is fixed at bottom thereof to a master cylinder 11 by means of hollow set bolt 12. A reservoir cap 13 closing an upper opening of reservoir 10 includes upper and lower members 14 and 15, both of which are made of synthetic resin and are connected to each other. Reservoir cap 13 further includes a nail assembly 16 made of elastic sheet metal and an annular sealing member 17 made of rubber.

Upper member 14 of reservoir cap 13 is provided with an annular flange portion 18 formed with two rectangular notches 19 which are located on opposite sides thereof. Annular flange portion 18 has further formed on an inner peripheral wall thereof two rectangular recesses 20 which are located on opposite sides and are circumferentially located midway between notches 19.

Lower member 15 is provided with an outward flange 21 located in upper member 14 and abutting on an upper end face 22 of reservoir 10. Flange 21 is formed with two notches 23, 23 opposing recesses 20,20, respectively, of upper member 14. Flange 21 is further formed with two projections 24, 24 extending into notches 19, 19, respectively, of upper member 14 and a plurality of ribs 25 on an upper face portion thereof. An annular groove 26 for receiving sealing member 17 is formed on a portion 27, which is located in reservoir 10, of lower member 15. A switch case 28 for housing a known level indicating device is formed on the lower member 15.

Nail assembly 16 includes an annular biasing portion 29 located in the interior of fringe portion 18 of upper member 14 and is supported by ribs 25 of lower member 15. Nail assembly 16 further includes two nails 30 formed on a lower end of biasing portion 29 and two operating tabs 31 formed on an upper end portion of biasing portion 29. Each tab 31 extends outwardly through a gap 32 between an upper end of each projection 24 and an upper bottom portion of each notch 19. Each nail 30 extends downwardly through the corresponding notch 23 and includes a tip 33 inwardly bent for engaging with an outward flange 33 formed on an upper end of reservoir 10. Preferably, tip 33 of each nail 30 is slanted upwardly so as to generate an outward force upon engagement between a lower face of tip 33 and an upper shoulder of flange 34 of reservoir 10 when reservoir cap 13 is forced downwardly in attachment of reservoir cap 13.

Biasing portion 29 is formed such that a strip portion formed with nails 30 and operating tabs 31 is bent into an annular shape and both ends thereof are fixedly connected to each other by connecting member 35. Biasing portion 29 normally biases nails 30 into engagement with flange 34 of reservoir 10 to thereby hold reservoir cap 14 on reservoir 10. When the operating tabs 31 are moved inside by an assembler's fingers, portions of nails 30 of biasing member 29 are moved outwardly due to inside movement of portions of operating tabs 31, thereby causing disengagement between nails 30 and flange 34 so that reservoir cap 13 may be detached from reservoir 10.

Figure 2:
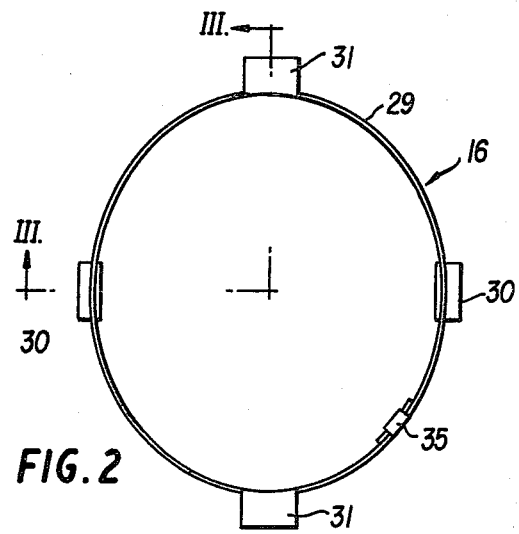
FIG. 2 is a plan view of a nail assembly of the first embodiment.
Figure 3:
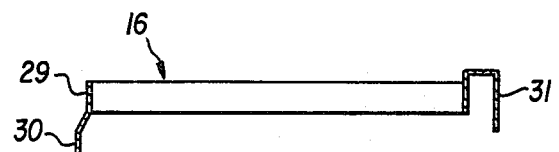
FIG. 3 is a sectional view taken along line III—III in FIG. 2.
Figure 4:
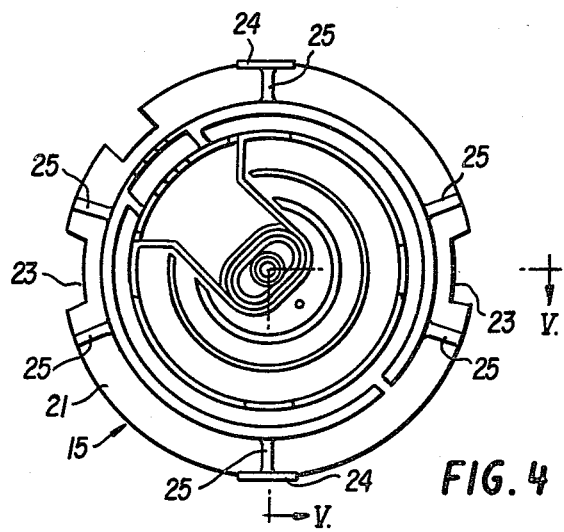
FIG. 4 is a plan view of a lower member of a reservoir cap of the first embodiment.
Figure 5:
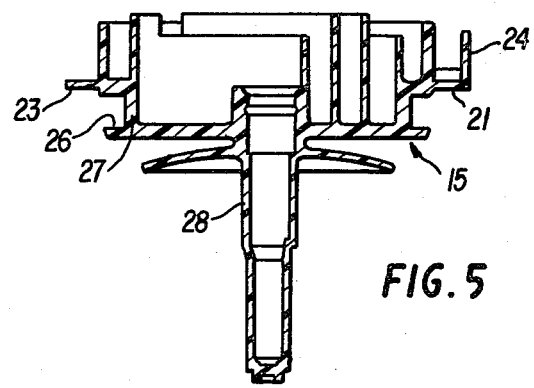
FIG. 5 is a sectional view taken along line V—V in FIG. 4.
Figure 6:
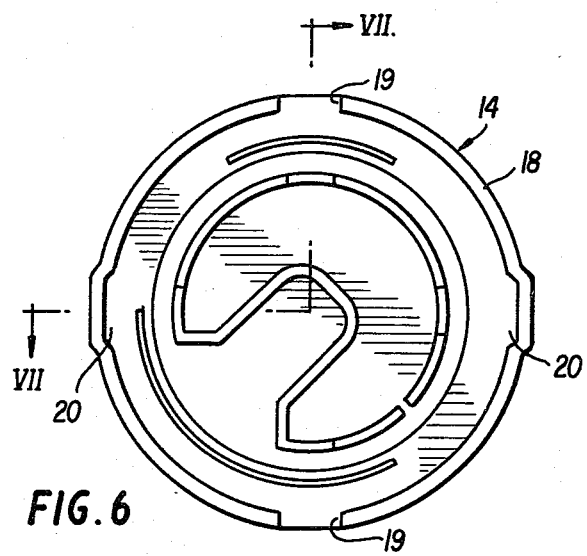
FIG. 6 is a bottom view of an upper member of the reservoir cap in the first embodiment.
Figure 7:
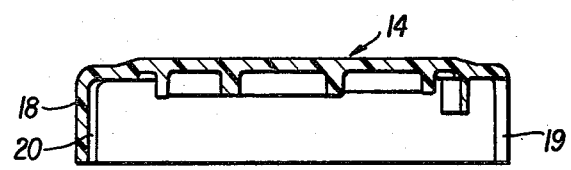
FIG. 7 is a sectional view taken along line VII—VII in FIG. 6.

Preferably, in order to increase the movement of each nail 30, biasing portion 29 is formed in an ellipical shape wherein operating tabs 31 are arranged on opposing spacing portions of the biasing portion 29 as shown in FIG. 2. In FIG. 2 connecting member 33 is preferably positioned midway between nails 30 and operating tabs 31 since movement of this position of the elliptical portion is less than the corresponding movement of the other portion of the biasing portion 29 to thereby prevent biasing portion 29 from breaking. Thus, reservoir cap 13 may be attached and detached rapidly and easily, without turning cap 13.

Figure 8:
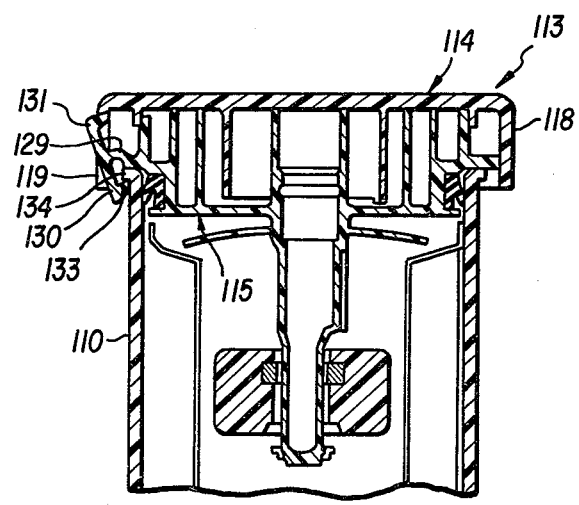
FIG. 8 is a side sectional view of a second embodiment of the fluid reservoir according to the present invention.
Figure 9:
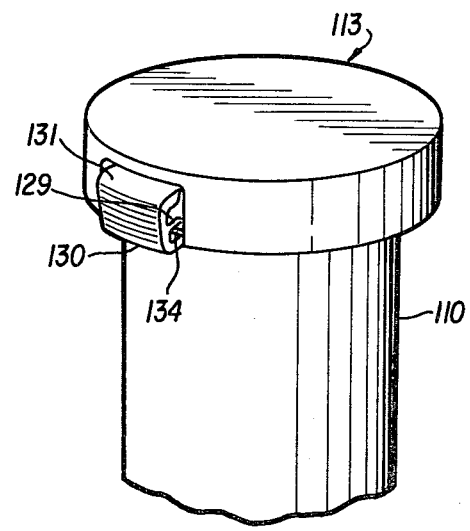
FIG. 9 is a perspective view of the second embodiment.

Referring to FIGS. 8 and 9, there is shown a second embodiment of the fluid reservoir according to the present invention. In this embodiment, a fringe portion 118 of an upper member 114 of a reservoir cap 113 is formed on opposing side thereof with two notches 119 in which nails 130 and operating tab 131 are located. Each nail 130 and operating tab 131 are formed as one piece and are connected to a lower member 115 made of synthetic resin with elasticity by biasing portion 129. Biasing portion 129 biases nails 130 into engagement with outward flange 134 of reservoir 110. When nails 130 engage with flange 134 at tips 133 thereof, operating tabs 131 project outwardly from the periphery of cap 113 so that nails 130 are disengaged from the flange upon inward movement of operating tabs 131 caused by the operator's fingers.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fluid reservoir assembly including a reservoir cap for closing a cylindrical upper opening of said reservoir, said reservoir assembly comprising:
    an outward flange formed on an outer periphery of an upper portion of said reservoir;
    nail means provided on said reservoir cap and having a tip portion bent radially inwardly;
    biasing means biasing said nail means into engagement with said outward flange; and
    nail operating means connected to said nail means for moving said nail means by said nail operating means against said biasing means.

2. A fluid reservoir according to claim 1, wherein said biasing means comprises annular elastic means disposed in said reservoir cap.

3. A fluid reservoir according to claim 2, wherein said nail means comprises a plurality of nail members connected to said annular elastic means and said nail operating means comprises a plurality of nail operating tabs connected to said elastic means, said nail members and said nail operating tabs being alternatively arranged along the circumference of said annular elastic means.

4. A fluid reservoir according to claim 3, wherein said annular elastic means, said nail members and said nail operating means comprises a one piece member and further comprises elastic sheet metal.

5. A fluid reservoir according to claim 4, wherein said annular elastic means comprises a strip member unitarily formed with said nail members and said nail operating tabs are annularly shaped such that opposite ends of said strip are fixedly connected to each other.

6. A fluid reservoir according to claim 4, wherein said annular elastic means is elliptically shaped, said nail operating tabs being arranged on opposing sides of said annular elastic means, and said nail members are arranged on opposing sides of said annular elastic means and located midway of said opposing sides of said annular elastic means.

7. A fluid reservoir according to claim 5, wherein said annular elastic means is elliptically shaped and said ends of said strip are positioned midway of at least one of said nail members and at least one of said nail operating tabs circumferentially adjacent thereto.

8. A fluid reservoir according to claim 1, wherein said tip of said nail means comprises a lower surface slanted upwardly.

9. A fluid reservoir according to claim 1, wherein said nail means and said nail operating means are unitarily formed as one piece and said biasing means comprises a connecting portion unitarily interconnecting said nail means and said nail operating means to said reservoir cap as one piece.

* * * * *